(12) United States Patent
Patapoutian et al.

(10) Patent No.: US 9,201,728 B2
(45) Date of Patent: Dec. 1, 2015

(54) MEMORY DEVICE WITH VARIABLE CODE RATE

(71) Applicant: Seagate Technology LLC, Cupertino, CA (US)

(72) Inventors: Ara Patapoutian, Hopkinton, MA (US); Ryan James Goss, Prior Lake, MN (US); Mark Allen Gaertner, Vadnais Heights, MN (US); Bruce Douglas Buch, Westborough, MA (US); Arvind Sridharan, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 92 days.

(21) Appl. No.: 14/025,327

(22) Filed: Sep. 12, 2013

(65) Prior Publication Data

US 2015/0074487 A1 Mar. 12, 2015

(51) Int. Cl.
*G06F 11/10* (2006.01)

(52) U.S. Cl.
CPC .................................. *G06F 11/1012* (2013.01)

(58) Field of Classification Search
CPC ............ G06F 11/1068; G06F 12/0246; G06F 11/108; G06F 12/0868; G06F 12/0804; G06F 2212/222; G06F 3/0688; G11C 27/005; G11C 16/0483; G11C 7/1006; G11C 11/5628; Y02B 60/1225
USPC .......... 714/719, E11.034, 767, 773, 777, 746, 714/755, 758, 782, 784, E11.03, 763, 800; 365/185.33; 711/114, E12.001, 711/E12.008
See application file for complete search history.

(56) References Cited

U.S. PATENT DOCUMENTS

| | | | |
|---|---|---|---|
| 7,739,576 B2 | 6/2010 | Radke | |
| 7,809,994 B2 | 10/2010 | Gorobets | |
| 7,975,192 B2 * | 7/2011 | Sommer et al. | ................ 714/719 |
| 8,001,450 B2 | 8/2011 | Onishi et al. | |
| 8,145,984 B2 * | 3/2012 | Sommer et al. | ................ 714/797 |
| 8,255,617 B2 | 8/2012 | Goss et al. | |
| 8,327,226 B2 | 12/2012 | Rub | |
| 8,364,886 B2 | 1/2013 | Goss | |
| 8,799,747 B2 * | 8/2014 | Goss et al. | .................... 714/773 |
| 8,806,106 B2 | 8/2014 | Goss et al. | |
| 8,861,109 B1 * | 10/2014 | Hwang et al. | .................... 360/31 |
| 2010/0165730 A1 * | 7/2010 | Sommer et al. | .......... 365/185.03 |

* cited by examiner

*Primary Examiner* — Phung M Chung
(74) *Attorney, Agent, or Firm* — Hall Estill Attorneys at Law (57) ABSTRACT

Method and apparatus for managing data in a memory, such as a flash memory. In accordance with some embodiments, the apparatus has a solid-state non-volatile memory and a processing circuit configured to write data to a selected location of the memory. The data are arranged in the form of multi-bit code words each comprising a user data payload and associated parity data configured to correct one or more bit errors in the user data payload. The processing circuit adjusts at least a selected one of a size of the code words, a size of the user data payloads or a size of the parity data responsive to at least a selected one of an accumulated count of access operations upon the selected location or an error rate associated with the selected location.

20 Claims, 6 Drawing Sheets

MEMORY DEVICE WITH VARIABLE CODE RATE

SUMMARY

Various embodiments of the present disclosure are generally directed to the management of data in a memory, such as but not limited to a flash memory.

In accordance with some embodiments, the apparatus has a solid-state non-volatile memory and a processing circuit configured to write data to a selected location of the memory. The data are arranged in the form of multi-bit code words each comprising a user data payload and associated parity data configured to correct one or more bit errors in the user data payload. The processing circuit adjusts at least a selected one of a size of the code words, a size of the user data payloads or a size of the parity data responsive to at least a selected one of an accumulated count of access operations upon the selected location or an error rate associated with the selected location.

These and other features which may characterize various embodiments can be understood in view of the following detailed discussion and the accompanying drawings.

DETAILED DESCRIPTION

The present disclosure generally relates to managing data stored in a memory module, such as but not limited to a flash memory of a data storage device.

A wide variety of data storage memories are known in the art. Some memories take the form of solid-state memory cells which store data in relation to an amount of accumulated charge on a floating gate structure, such as with flash memory. An erasure operation is generally required before new data can be written to a given flash memory location.

Flash memory cells may be configured as single-level cells (SLCs) so that each cell stores a single bit (e.g., a logical 0 or 1), or as multi-level cells (MLCs) so that each cell stores multiple bits (two bits or more). MLCs store different data blocks across the same group (e.g., row) of cells. The least significant bits (LSBs) of the programmed states of the cells along the row can represent a first block (page) of data, and the most significant bits (MSBs) of the programmed states of the cells along the row can represent a second page of data.

Data may be stored in a flash memory in the form of a user data payload and associated parity data. The parity data, sometimes generally referred to as error correction codes (ECC), enable up to a selected number of bit errors to be detected and corrected in the payload during a read operation. The parity data can take a variety of forms such as BCH (Bose, Chaudhuri and Hocquenghem) codes, Reed Solomon ECC codes, LDPC (low density parity check) codes, Hamming codes, checksums, etc.

Flash memory tends to have a relatively limited operational life and can exhibit an increase in bit error rate (BER) over time as more and more program/erase (PE) cycles are experienced by the memory. In some cases, a worst-case BER rate is identified that is expected to be exhibited at the end of the operational life of the memory. A parity scheme is adopted that is capable of detecting and correcting errors at this worst-case BER level, and this parity scheme is used throughout the operational life of the memory.

While operable, such a scheme is wasteful from a resource standpoint since early and mid-life portions of the operational life of the memory will tend to have BER levels that are much lower than the capability of the parity scheme. Moreover, the overall data capacity of the memory is reduced since the parity data storage footprint is larger than what would be strictly necessary, and this reduces the available space for the storage of user payload data.

Accordingly, various embodiments of the present disclosure are generally directed to an apparatus and method for managing data in a memory, such as but necessarily limited to a flash memory.

As explained below, code words are formed having a user data payload and associated parity data. For each code word, an appropriate strength of parity data is provided based on the then-existing BER characteristics of the memory location in which the code words are stored. The lower the strength of the parity data (ECC), generally the smaller the footprint of the ECC within the code word, and the higher the strength of the ECC, generally the larger the footprint of the ECC within the code word.

In some embodiments, the overall size of the code words is maintained at a constant value, so that more user data payload is stored in each code word for lower strength ECC schemes and less user data payload is stored in each code word for higher strength ECC schemes. This approach can store an integer number n of code words to each row of memory cells, such as sixteen code words per page (n=16).

In other embodiments, the overall size of the user data payloads in each code word is maintained at a constant value, so that the code words become larger with the implementation of higher strength ECC schemes. In this latter case, code words may wrap across multiple rows of memory cells depending on the relative sizes of the rows and the code words.

Metadata are generated and used to track the locations and statuses of the respective code words. Bit error rates (BERs), program/erase (PE) counts and other performance parameters are accumulated and used to select appropriate code words for different locations. It is contemplated, albeit not necessarily required, that wear leveling will be implemented so that all of the memory blocks within the flash memory have substantially similar numbers of PE counts (more generally, access operations). In such case, stepwise changes in ECC strength (new code indices) can be implemented globally. However, in other cases different memory locations may utilize different code indices at different times.

Figure 1:
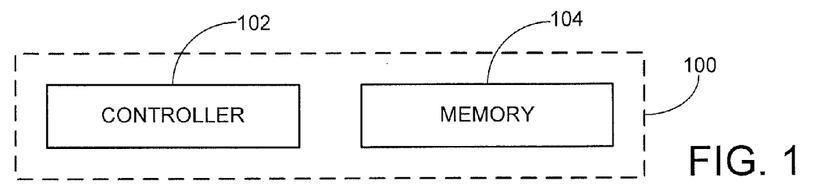
FIG. 1 provides a functional block representation of a data storage device arranged to communicate with a host device in accordance with various embodiments.

These and other features of various embodiments can be understood beginning with a review of FIG. 1 which provides a simplified block diagram of a data storage device 100 having a controller 102 and a solid-state memory module 104. The controller 102 may be a hardware-based or programmable processor. The memory module 104 may take a variety of forms. For purposes of providing a concrete example, the device 100 will be contemplated as comprising a solid state drive (SSD) and the memory module 104 will comprise flash memory. Other configurations can be used.

Figure 2:
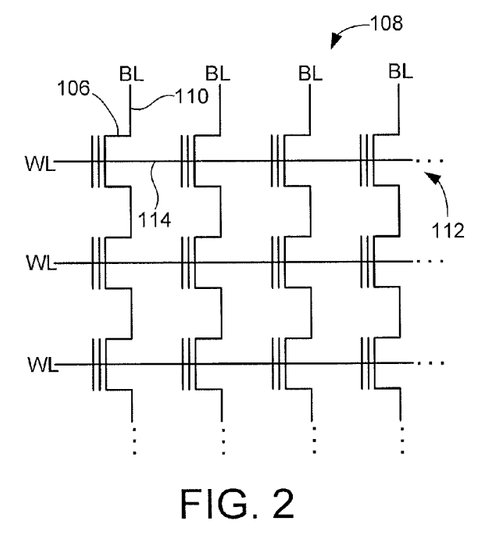
FIG. 2 is a schematic depiction of a portion of a flash memory array of FIG. 1.

The flash memory of the module 104 incorporates individual flash memory cells 106, as depicted in FIG. 2. The flash memory cells in FIG. 2 are arranged in a NAND configuration so that columns 108 of the cells are connected via bit lines (BL) 110 and rows 112 of the cells are connected via word lines (WL) 114.

Each flash memory cell 106 takes the general form of an n-channel metal oxide semiconductor field effect transistor (nMOSFET) with drain, source and control gate terminals. Each cell includes an isolated floating gate structure which accumulates charge during a programming (write) operation by the selected application of appropriate voltages to the respective drain, source and control gate terminals via the BL and WL control lines 110, 114. An erasure (erase) operation removes charge from the floating gate structures of a group of cells and returns the cells to an initial erased state.

In the initial erased state, a cell will generally tend to exhibit drain-source conductivity across the intervening channel without the application of voltage to the control gate. Once charge has been accumulated on the floating gate, the drain-source path will be non-conductive unless a sufficiently high gate control voltage is applied to the control gate, at which point the cell becomes conductive. The programmed state of the cell can be determined by sensing the level of control gate voltage required to allow drain-source current to pass through the cell, which generally correlates to the amount of accumulated charge on the floating gate.

The memory cells 106 can be configured as single-level cells (SLCs) or a multi-level cell (MLCs). An SLC stores a single bit; a normal convention is to assign the logical bit value of 1 to an erased cell (substantially no accumulated charge) and a logical bit value of 0 to a programmed cell (presence of a selected threshold of accumulated charge). An MLC stores multiple bits, such as two bits. Generally, n bits can be stored using $2^n$ storage states. A normal convention is to assign the multi-bit logical value 11 to an erased cell with charge C0 (substantially no accumulated charge), and then sequentially assign the remaining multi-bit logical values 01, 00 and 10 to increasingly higher charge levels C1, C2 and C3.

Figure 3:
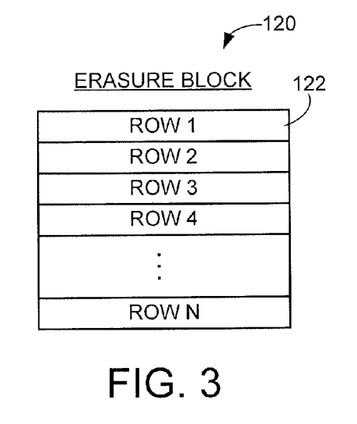
FIG. 3 illustrates an exemplary format for an erasure block of the flash memory array.
Figure 4:
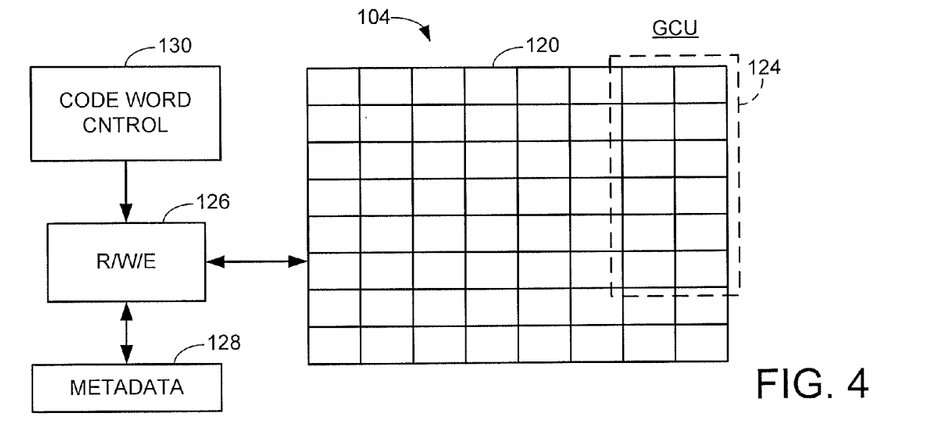
FIG. 4 illustrates a number of erasure blocks arranged into garbage collection units (GCUs).

The memory cells may be grouped into erasure blocks 120, as depicted in FIGS. 3 and 4. Each erasure block 120 may be a separately addressable block of memory and represents the smallest unit of memory that can be concurrently erased at a time. Each erasure block 120 may be arranged as a plurality of rows 122 of memory cells, with each row sharing a common word line (FIG. 2) and accommodating the storage of a selected amount of user data. Other internal arrangements and interconnections of cells can be utilized as desired. One exemplary erasure block size is 8192 bytes (B) by 128 rows. Other sizes can be used.

Block-level wear leveling may be employed to track the erase and write status of the various blocks 120. New blocks will be allocated for use as required to accommodate newly received data. In some embodiments, groups of blocks 120 are accumulated into larger garbage collection units (GCUs) 124 which are allocated, used and erased as a unit. GCUs 124 may take any suitable size.

FIG. 4 further shows a read/write/erase (R/W/E) circuit 126, which may form a portion of the memory module 104 (FIG. 1). The R/W/E circuit 126 includes various column and row decoders, drivers, sensors, etc. to enable the system to write data to the respective erasure blocks 122. In some embodiments, an entire row's worth of data are written at a time (e.g., 8192 B, etc.), and an entire row's worth of data may be read back at a time. Such blocks of data are referred to as pages.

Metadata may be loaded to a local memory 128 for use by the R/W/E circuit 126 during device operation. The metadata generally describe the locations of the data in the memory 104, and provide other control information such as performance parameters, accumulated counts, etc. The metadata enables conversion from logical addresses (such as logical block addresses, LBAs) used at the host level to physical addresses (such as physical block addresses, PBAs) used at the memory module level.

Each time that a given set of LBAs is provided for storage to the memory module 104, the R/W/E circuit 126 will write the data to a new location and the older version(s) of the LBAs will be marked as stale. Forward pointers will be added to the metadata to enable the R/W/E circuit 126 to locate the most current version of the data during a subsequent read operation. Once sufficient amounts of data in a given GCU is stale, a garbage collection operation can be carried out to migrate the remaining current data to new locations, erase the erasure blocks in the GCU and return the GCU to an allocation pool pending subsequent allocation for the storage of new data.

FIG. 4 further shows a code word (CW) control circuit 130. The CW control circuit 130 operates to establish applicable code word schemes (code indices) for use in the storage of data to the memory module 104. It is contemplated that at least portions of the CW control circuit 130 will be incorporated into the controller 102 (FIG. 1), although such is not necessarily required.

Figure 5:
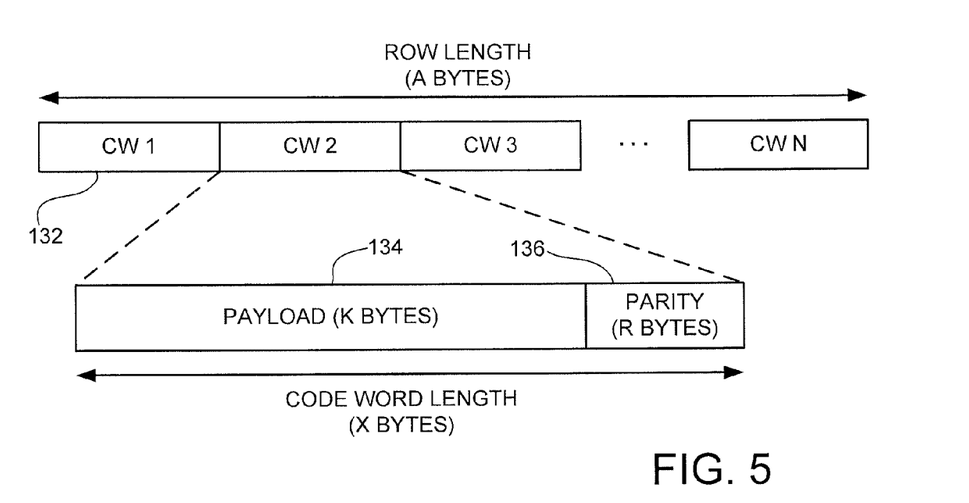
FIG. 5 shows storage of data to the erasure blocks of FIGS. 3-4 in code words formatted in accordance with some embodiments.

FIG. 5 shows an exemplary format for code words established by the CW control circuit 130 of FIG. 4. In FIG. 5, a total of N code words 132 (CW 1 to CW N) are stored to each row 122 (FIG. 3). Each row has a row length of A bytes (B), and each code word has a code word length of X bytes, so that $X=A/N$. Each code word 132 includes a user data payload 134 (K bytes) and parity data 136 (R bytes, so that $X=K+R$). In the example of FIG. 5, the code word length X is set to a fixed value and this value is maintained for all code words throughout the operational life of the device 100.

Some flash memories such as 104 are provided with both a user data area and an associated ECC area along each row 122 (FIG. 3). The ECC area is designed to accommodate ECC data to correct the data stored in the user data area. One currently utilized configuration provides a user data area of 8192 B and an ECC data area of 1024 bytes. Since both the user data area and ECC data area are available for the storage of the code words 132, this provides a total row length of 9216 B (A=8192 B+1024 B). Assuming a total of 16 code words are provided to each row (page), the code word length can be specified as 1152 B (X=1152 B).

Figure 6:
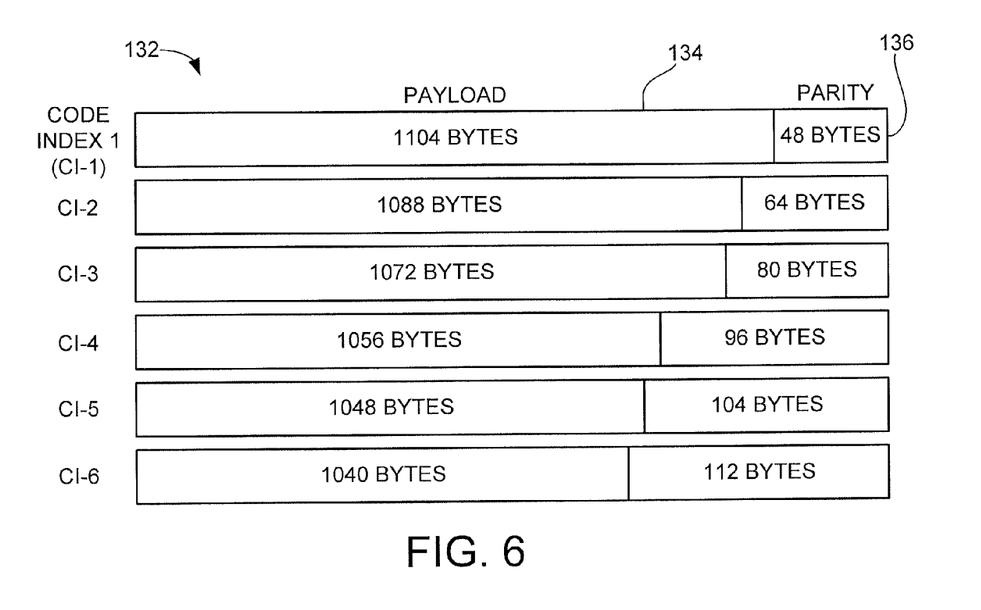
FIG. 6 illustrates different code indices for the code words in FIG. 5 having different respective amounts of parity data and user data payloads.

The relative sizes of the payload (K bytes) and parity data (R bytes) can vary, as shown in FIG. 6. More specifically, FIG. 6 depicts six (6) different code word schemes, referred to as code indices (CI-1 to CI-6). Other arrangements can be used. The code indices range from a low strength ECC scheme (CI-1) to a high strength ECC scheme (CI-6).

As can be seen from FIG. 6, the sizes of the parity data (R bytes from FIG. 5) can range from 48 B to 112 B, and the sizes of the user data payload (K bytes from FIG. 5) can range from 1104 B to 1040 B. In each case, the total size of the code words remains constant at 1152 B. As the ECC strength increases, the footprint of the parity data increases and the footprint of the user data payload decreases. A code rate (CR) can be defined as:

$$CR = \frac{K}{K+R}(100\%) \tag{1}$$

Over time, K will decrease as R increases, and the code rate CR will be reduced. For reference, CI-1 provides a code rate of about 95.8% and CI-6 provides a code rate of about 90.2%. As noted above, other respective values can be used.

The payload boundaries vary and may not be aligned with logical address boundaries (e.g., LBA sizes of 4096 B, etc.). A data recovery operation for a selected set of LBAs may involve the readback of the code words 132 having payload data corresponding to the LBAs, followed by the application of the parity data to detect and correct bit errors and the assembly of the recovered data into the original LBA data sets for transfer to the requesting host device.

Figure 7:
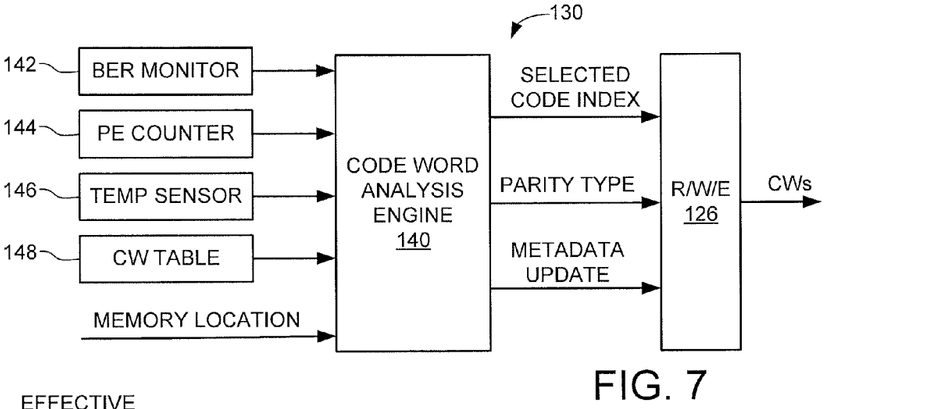
FIG. 7 is a functional block representation of code word control circuitry operable in accordance with some embodiments to arrange data into code words as set forth by FIGS. 5-6.

FIG. 7 is a functional block representation of the code word (CW) circuit 130 from FIG. 4 in accordance with some embodiments. The CW circuit 130 includes a code word analysis engine 140 which receives a number of inputs to select appropriate code indices for the storage of user data. These inputs include bit error rate (BER) data from a BER monitor 142, a program/erase (PE) count from a PE counter 144, temperature data from a temperature (temp) sensor 146, and CW data from a CW table 148.

Because the code indices are selected based on the state of individual memory locations, a memory location (e.g., PBA, etc.) is also provided to the analysis engine 140. The analysis engine 140 in turn outputs a selected code index, a parity type (e.g., BCH, RS, LDPC, etc.) and, as desired, updated metadata information for use by the R/W/E circuit 126. The R/W/E 126 proceeds to format the received user data into the appropriate code words, including the generation of the parity data, and writes the code words to the selected memory location.

Figure 8:
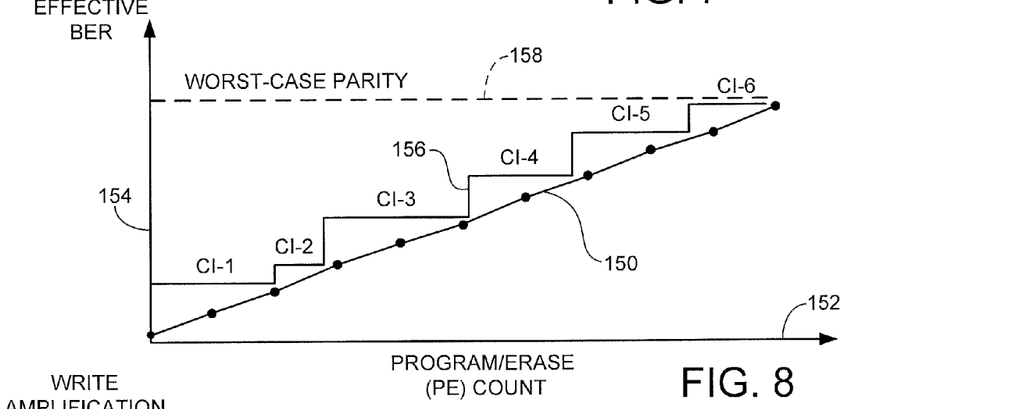
FIG. 8 graphically illustrates bit error rate (BER) and code indices over an operational life of the device of FIG. 1.

FIG. 8 is a graphical representation of a bit error rate (BER) curve 150, plotted against a program/erase (PE) count x-axis 152 and an effective BER y-axis 154. The PE count generally represents an accumulated count of PE (access) operations upon a selected memory location (e.g., a row 122, FIG. 3) of the flash memory module 104. The memory module 104 may have a specified life, such as around 35,000 PE operations, and the curve in FIG. 8 may extend to this level or may extend beyond it. The effective BER indicates the BER rate with the application of the parity data to the user data payloads.

The curve 150 is shown to be substantially linear, although other shapes may be encountered. The curve 150 can be generated by monitoring, over time, the effective BER of the flash memory device using, for example, the BER monitor circuit 142 of FIG. 7.

FIG. 8 further shows a code index curve 156. The code index (CI) curve 156 takes a step-function shape. Each plateau represents a different code index from FIG. 6. This is merely illustrative as not all available code indices necessarily need be used, nor do they need to necessarily be used in the depicted order. Further, in yet some other embodiments, additional code indices may be employed in order to provide a higher code rate for a given PE count. For purposes of comparison, a worst-case parity level is depicted by broken line 158. As noted above, the worst-case parity level generally represents a parity level selected based on the BER performance expected to be encountered as the device reaches the end of its operational life.

As can be seen from FIG. 8, different code indices are utilized over the operational life of the device 100. Initially, CI-1 is used so that data are stored in code words having 48 B of parity data and 1104 B of payload data. This continues until an increase in the observed effective BER warrants a stepwise increase in ECC strength, as denoted by the switch to CI-2, and so on. Any suitable CI profile can be used.

It will be appreciated that the distance between the step-function CI curve 156 and the substantially linear BER curve 150 at any point represents the overprovisioning of error correction capability by the system at that point. Reducing this distance to a minimum will tend to improve performance by providing error correction capabilities suitable for the then-existing BER performance of the system, and by increasing the then-available amount of memory for the storage of user data. By contrast, the significant distance between the worst-case line 158 and the curve 150 shows that, for most of the operational life of the device, using a worst-case ECC scheme is wasteful and unnecessary.

In some embodiments, at high code rates (such as CI-1) a BCH scheme may be used for the parity data. Over time, the analysis engine 140 (FIG. 7) may switch to a stronger version of this same type of ECC, or may select a new scheme such as an interactive LDPC approach. Additional layers of ECC may also be implemented in some schemes.

Figure 9:
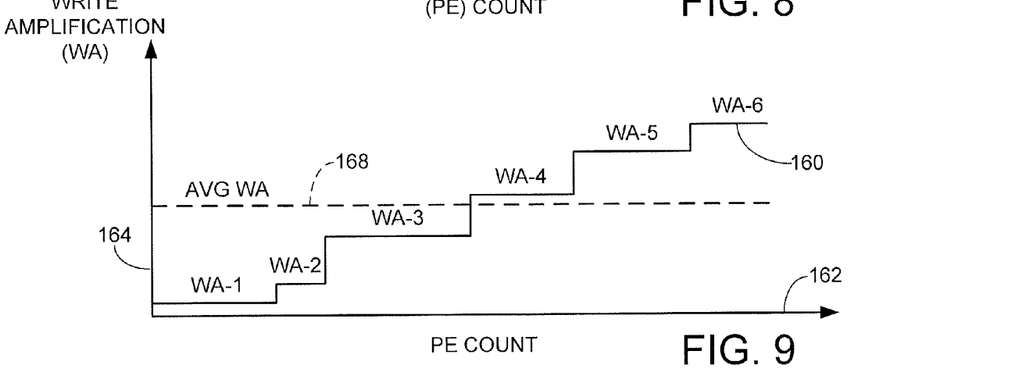
FIG. 9 graphically illustrates write amplification (WA) data over an operational life of the device.

FIG. 9 shows write amplification benefits that can be achieved using the step-wise ECC strength enhancements of FIG. 8. As will be appreciated by those with skill in the art, write amplification (WA) generally describes the number of copies of a given data set that are written to the memory. Initially writing data a first time counts as one write. If the data are subsequently migrated to a new location as a result of a garbage collection operation or for other reasons (detected read disturb, etc.), this will count as one additional write.

The more times that a given set of data are written to the memory module 104, the higher the overhead processing and the lower the available memory to accommodate new data. It can therefore be desirable to maintain a relatively low WA value. An example WA value may be on the order of about 3.2, meaning that, on average, each set of data are written an average of 3.2 times during the course of the time the data are present in the system. Other values can be used based on a number of factors, including workload.

It is contemplated that the system will experience a step-wise change in WA over the operational life of the device 100, as depicted by write amplification (WA) curve 160, using the tailored ECC schemes of FIG. 8. The WA curve 160 is plotted against a PE count x-axis 162 and a write amplification (WA) y-axis 164. Empirical data suggests that the WA curve may closely mirror the CI curve, as can be seen by a comparison of the respective curves 156, 160 in FIGS. 8-9. An average WA level is denoted by broken line 166. It has been found in some cases that the use of the code indices of FIG. 8 can desirably reduce the average WA experienced by the system as compared to the use of a worst-case parity approach as represented by line 158 in FIG. 8.

Figure 10:
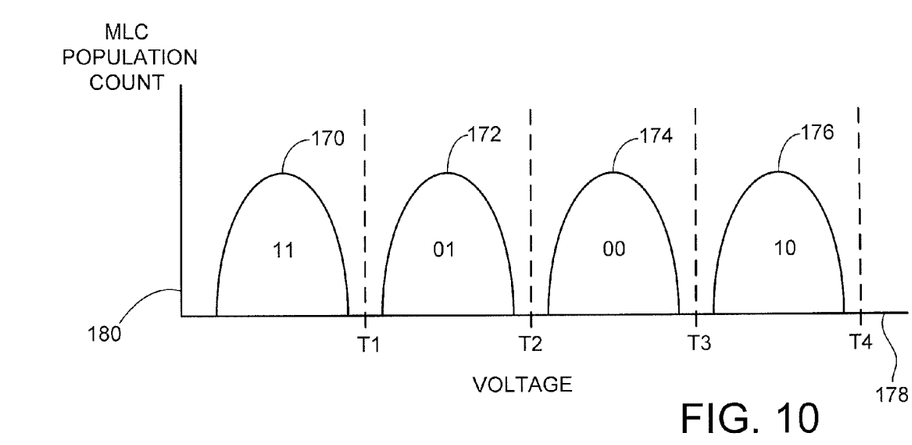
FIG. 10 shows different populations of multi-level cells (MLCs).

FIG. 10 is a graphical representation of the use of multi-level cells (MLCs) to store data to the flash memory cells 106 of the memory module 104. More particularly, FIG. 10 illustrates exemplary normalized charge distributions 170, 172, 174 and 176 for different levels of charge stored on the various flash memory cells 106 in the array of FIG. 2. The distributions are plotted against a common x-axis 178 indicative of voltage magnitude and a common y-axis 180 indicative of cell population count.

The distributions 170, 172, 174 and 176 represent variations about nominal accumulated charge states $C0<C1<C2<C3$, and correspond to MLC programmed states 11, 01, 00 and 10. Other encoding schemes can be used. Distribution 170 represents variation in the amount of charge on the memory cells in the array that have been programmed to the state 11, distribution 172 corresponds to state 01, distribution 174 corresponds to state 00, and distribution 176 corresponds to state 10. The cells in population 176 have the most accumulated charge and the cells in population 170 have the least accumulated charge.

The programmed states 11, 01, 00 and 10 may represent data for two different pages (blocks) of data in each cell. In this case, the least significant bit (LSB) of the programmed state may provide a bit value for a first page, and the most significant bit (MSB) of the programmed state may provide a bit value for a second page. As noted above, the data in each page will be arranged in the form of code words 132. Each page can be written using a different code index.

The respective charge distributions 150-156 are ideally non-overlapping to allow the application of suitable read-threshold voltages T1, T2, T3 and T4 to differentiate between the various programmed states. Threshold T1 nominally provides a voltage level sufficient to place all of the memory cells in distribution 170 into a source-drain conductive state, but insufficient to place the cells in distributions 172, 174 and 176 into a conductive state. The threshold T4 is generally large enough to place all of the cells in a conductive state irrespective of their programmed state.

The programmed state of a selected flash memory cell can be read by placing the bit line 110 (FIG. 2) for the selected cell at a suitable forward voltage (e.g., +3V, etc.), and placing the remaining non-selected bit lines at some other lower reference voltage (e.g., 0V). The non-selected word lines 114 for rows not containing the selected cell can be placed at the highest threshold T4, so that all of the cells in the selected column other than the selected cell are placed in a source-drain conductive state.

One or more read-threshold voltages can be thereafter applied to the WL 114 associated with the selected cell, and the programmed state of the selected cell can be determined in relation to whether current flows through the bit line 110 and the other cells in the selected column. The read operation thus assesses whether a given read-threshold voltage is sufficient to place the selected cell in a conductive state; the higher the applied voltage required to obtain current flow through the column, the higher amount of accumulated charge is present on the floating gate.

In some embodiments, a first page of data is written to the cells along a selected row of cells in SLC mode as a first set of code words 132. The first page of data will constitute a bit sequence of logical 0s and 1s in some order (e.g., 001011110100100 . . . ). One bit will be stored in each cell. Those cells in which a logical 1 is to be stored may receive no programming effort (or minimal programming effort) so as to have a charge level that falls within the "11" distribution 170. Those cells in which a logical 0 is to be stored will receive sufficient programming effort to raise the charge level to fall within the "00" distribution 174.

To read back the stored bit sequence from the SLCs, the read threshold voltage T2 can be applied to each cell in turn, and the stored state (logical 1 or 0) can be determined in relation to whether the cell is placed into a conductive state as a result of the applied read threshold voltage.

A second page of data may be subsequently overwritten to the SLC cells to convert the cells into MLC form. As before, the second page of data will be arranged as a sequence of code words and will constitute a bit sequence of logical 0s and 1s with one bit from the second page of data being stored to each cell. Those cells to which a logical 1 is to be stored will receive no additional programmed effort. Those cells to which a logical 0 is to be stored will receive sufficient additional charge to increment the charge level to the next higher distribution.

If a logical 1 is to be written to a memory cell programmed in the "11" distribution 170, the additional charge will transition the cell to the "01" distribution 172. Similarly, if a logical 1 is to be written to a memory cell programmed in the "00" distribution 174, the additional charge will transition the cell to the "10" distribution 176. In each case, the LSB of the programmed cell (rightmost bit) indicates the bit value for the first page of data and the MSB of the programmed cell (leftmost bit) indicates the bit value for the second page of data.

Figure 11:
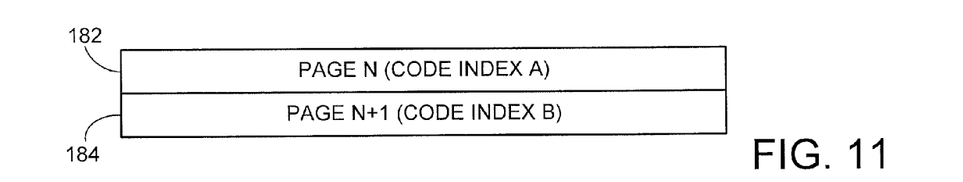
FIG. 11 represents two different pages of data written to the same row of flash memory cells in the array of FIG. 2.

FIG. 11 shows the use of two different pages, Page N and Page N+1, written to a selected row of physical memory cells 106 in a selected row 122 of a selected erasure block 120 (see FIGS. 2-3). The first page, Page N, is written using a first code index A (e.g., CI-3). The second page, Page N+1, is written using a different, second code index B (e.g., CI-5). FIG. 11 thus demonstrates that, while it is contemplated that a common code index may be used for a given memory location, in the context of MLC recording, different code words may be applied for different pages of data written to the same location.

Figure 12:
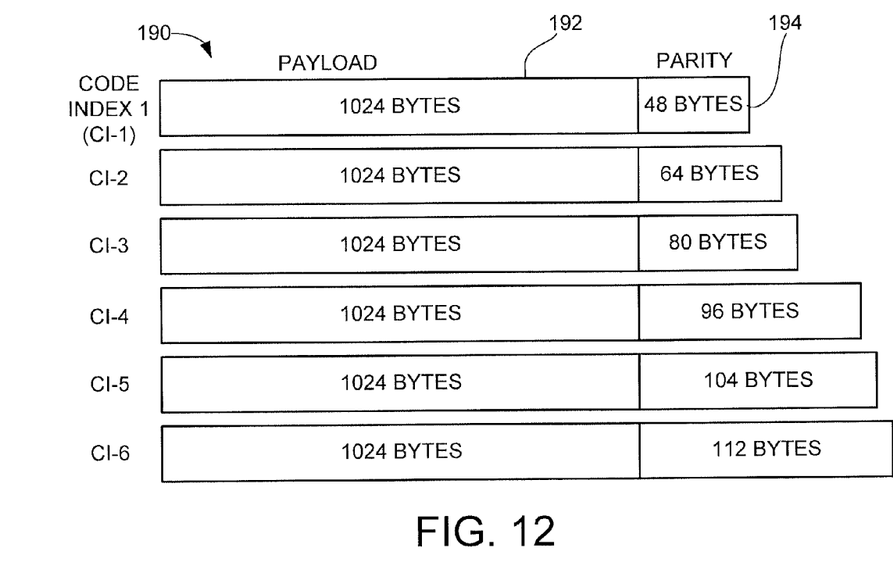
FIG. 12 illustrates different code indices for another embodiment in which parity data sizes are increased and user data payload sizes remain constant.

FIG. 12 shows an alternative embodiment in which code words 190 are provide having variable length. As before, each code word 190 includes a user data payload 192 and associated parity data 194. Also as before, the code words are arranged as different code indices (identified as CI-1 through CI-6) which have successively increased strengths of ECC (and associated parity data footprints). However, in FIG. 12, the amount of user data payload is maintained constant (e.g., 1024 B), so that as the ECC strength increases, the size of the code words 190 also increases.

A benefit of the scheme of FIG. 12 is that the user data payloads remains more closely align with LBA boundaries. For example, using an LBA size of 4096 B, each LBA will require four (4) code words 190 to store the user data therein. On the other hand, because of the nonstandard code word sizes provided in FIG. 12 (which range from 1072 B for CI-1 to 1136 B for CI-6), filler bits may be required to align with page boundaries and some code words may need to be split from one page to the next.

Figure 13:
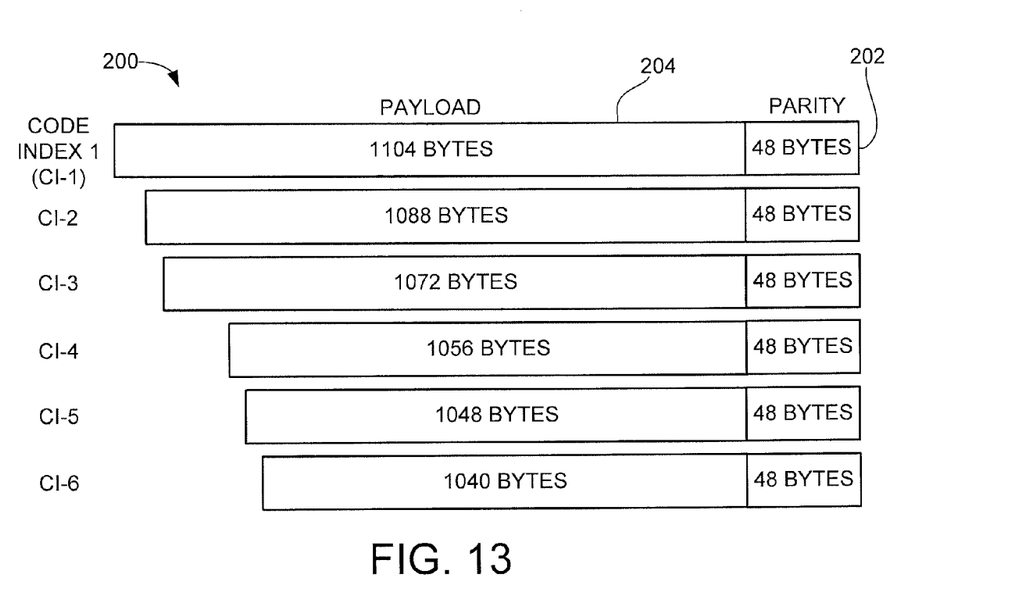
FIG. 13 illustrates different code indices for another embodiment in which user data payloads are decreased and parity data sizes remain constant.

FIG. 13 illustrates another example format for code words 200 generated by the code word control circuit 130 of FIGS. 4-5. The code words 200 maintain constant sized parity data 202, but successively reduce the corresponding user data payload 204. Thus, the code words 200 become successively shorter, meaning that the same ECC scheme in the parity data is required to detect/correct bit errors in successively smaller amounts of payload. The ECC scheme can remain constant for code indices CI-1 through CI-6, or can change so long as the overall footprint remains constant.

Figure 14:
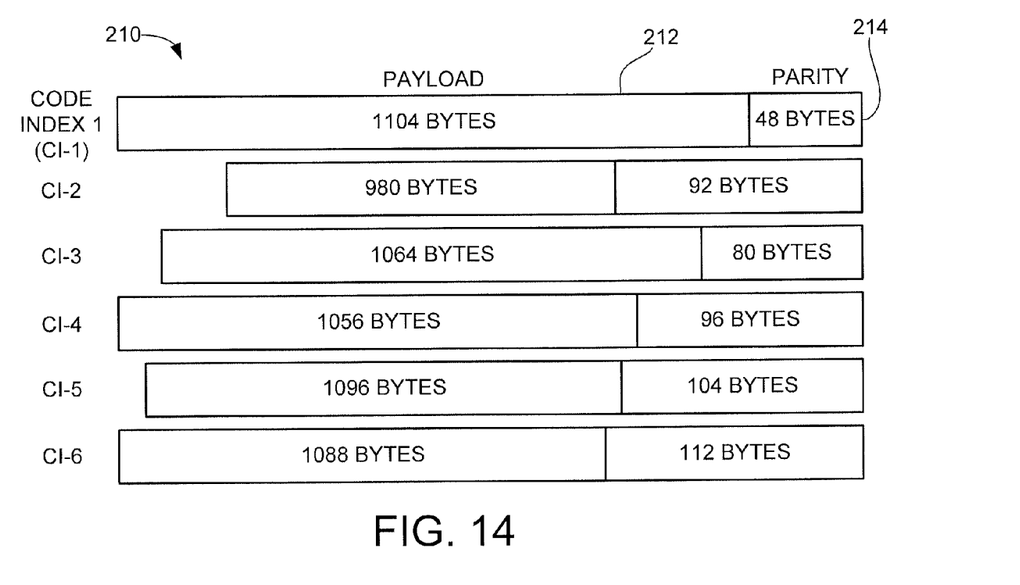
FIG. 14 illustrates different code indices for another embodiment in which both user data payload and parity data sizes are adjusted.

Any number of combinations of changes in ECC strength relative to parity and payload footprints can be incorporated as required. For example, FIG. 14 depicts code words 210 with user data payloads 212 and parity data 214, both of which change for each code index. Some ECC schemes are more suited to different total amounts of payload data, so it is contemplated that in some cases code word sizes (as well as payloads and parity) may increase and/or decrease as ECC strength increases. In some cases, some or all of the code word parameters (e.g., code word size, payload size and parity data size) can be adjusted while still maintaining an integral number of code words per page (or other data area size).

Each of the foregoing code word formats have provided a contiguous payload area followed by a contiguous parity data area (see e.g., FIGS. 5-6, 12-14). Other arrangements can be used including the co-mingling of the parity data with the payload data, the placement of the parity data before the payload data, etc.

Figure 15:
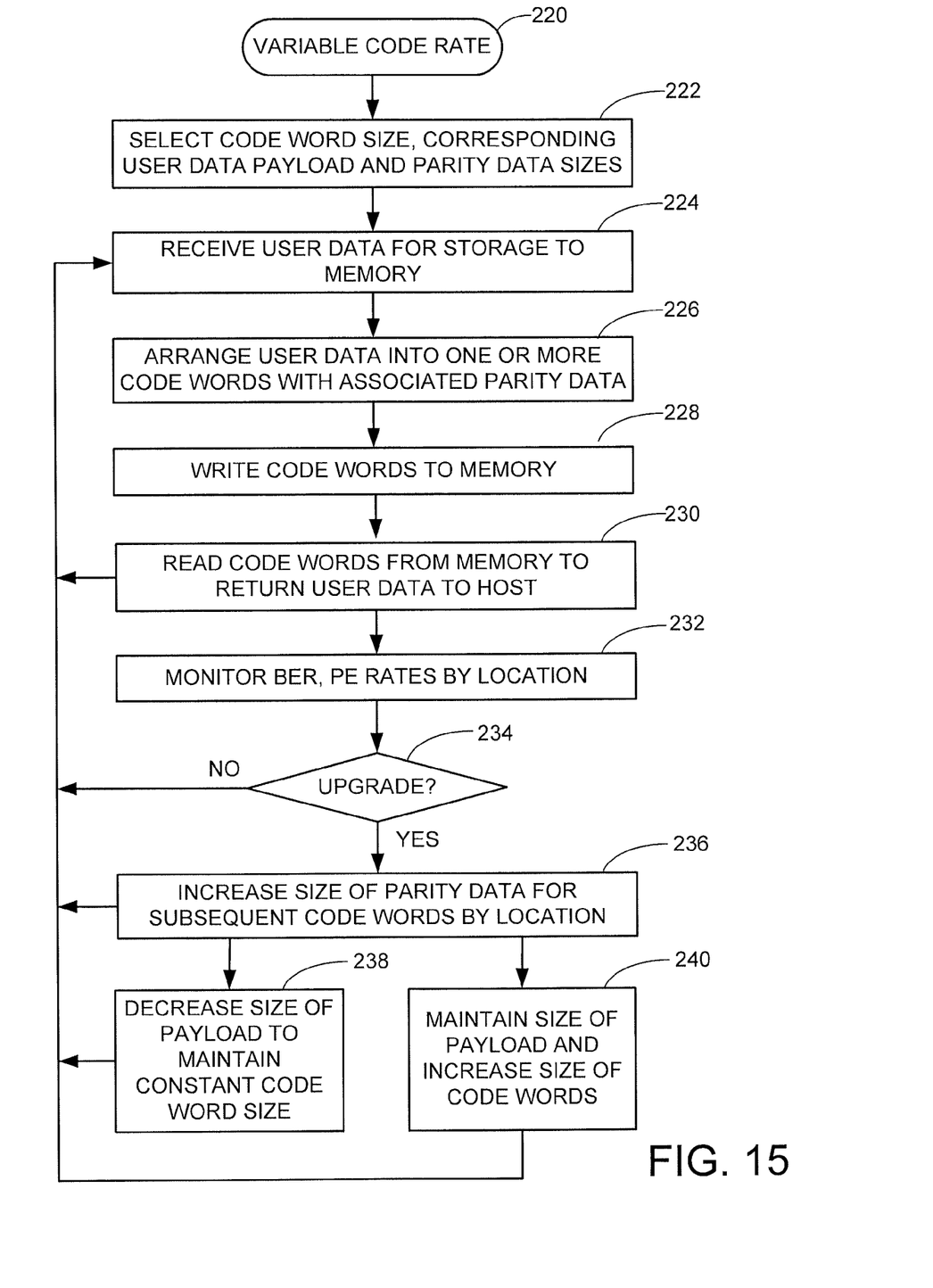
FIG. 15 is a flow chart for a VARIABLE CODE RATE routine illustrative of steps carried out by the device of FIG. 1 in accordance with various embodiments.

FIG. 15 is a flow chart for a VARIABLE CODE RATE routine 220 illustrative of some steps that may be carried out in accordance with the foregoing discussion. Other steps may be utilized, and the steps shown in FIG. 15 can be modified, omitted and/or performed in a different order. It is contemplated that FIG. 15 describes operation of the device 100 to store data to a flash memory module 104, although such is merely exemplary and not limiting as other types of non-volatile memory can be used.

At step 222, an initial code word size, corresponding user data payload size and parity data size is selected. This may, for example, correspond to a selected code index such as the code index CI-1 in FIG. 6 or FIGS. 12-14. The initial code index represents a suitable ECC strength for the then-existing state of the memory. Different ECC strengths may be selected for different portions of the memory. Different ECC strengths may further be selected based on other parameters as well, such as priority of data, etc.

For example, high priority data may be provided with a higher ECC strength, such as CI-5 whereas lower priority data may be provided with a lower ECC strength, such as CI-1. This involves a tradeoff between data recovery reliability and response time versus processing overhead. In some cases, a first portion of the memory 104 may be initially subjected to a first code index scheme (e.g., CI-1) and another portion of the memory 104 may be initially subjected to a different, second code index scheme (e.g., CI-2).

Continuing with FIG. 15, user data are received from a host device for storage to the memory at step 224. The data may be in the form of logical addresses (e.g., LBAs) and may be grouped in a first LBA size (e.g., 4096 B per LBA, etc.).

The received user data are arranged into one or more code words, and associated parity data are generated therefor at step 226. The generated code words are next written to a selected location within the memory at step 228. This may include the writing of the code words to one or more pages of memory as well as the generation and updating (as required) of appropriate metadata to enable the system to subsequently retrieve the data. The metadata may record the code word index scheme, the associated LBAs, time-date stamp information, etc. Counters, such as program (write) counts may be incremented by circuitry such as the PE counter 144 in FIG. 5.

The code words are subsequently read during a read operation at step 230 to retrieve the user data to a requesting host device. This may be scheduled responsive to a read request from the requesting host device to retrieve data associated with a selected logical address (e.g., a set of LBAs, etc.). Step 230 may include recovery of the bit values associated with one or more code words in one or more locations to satisfy the read request. The parity data will be used to correct bit errors in the recovered user data payloads, and the recovered and corrected data will be assembled into the requested LBAs and returned to the requesting host device.

During the operation of steps 222-230, various monitoring circuits such as discussed above in FIG. 5 will accumulate various performance statistics such as BER, PE counts, temperature, etc. This may be carried out on a location basis, such at the GCU, erasure block, row, page and/or individual cell level. Performance statistics may additionally or alternatively be maintained at the die, array, stripe, etc. levels. While not shown, it will be understood that the foregoing operations will continue to be carried out by the system on an on-demand basis to satisfy host write and read commands. In the background, garbage collection and other data management operations can be carried out to manage the memory by performing wear leveling, reducing read and write disturb effects, reducing write amplification, etc.

Decision step 234 determines whether, for a given memory location or for the entire memory, whether it is time to upgrade to a new code index with a relatively stronger ECC capability. This can be carried out based on detected BER levels, detected PE counts, etc. If a code index change is warranted, the routine passes to step 236 where, in at least some cases, the size of the parity data is increased for subsequent code words, such as depicted in FIGS. 6 and 12-13. At step 238, the payload is decreased by a corresponding amount to maintain a constant code word size, as discussed above in FIG. 6. Alternatively, at step 240 the payload is maintained at a constant size and the overall size of the code words is increased, as discussed above in FIG. 12. The forgoing steps are repeated using the new code index.

Although not shown in FIG. 15, it will be appreciated that other alternatives such as maintaining the same parity data footprint (as in FIG. 13) or adjusting both the parity data footprint and the payload footprint (as in FIG. 14) may be carried out. In each case, the ECC strength is increased, thereby increasing the ability of the system to accommodate the increases in BER that come from age of the memory.

In sum, various embodiments operate to arrange data into code words each having a user data payload and corresponding parity (ECC) data. In each case, the code rate is increased to provide enhanced ECC strength to compensate for BER degradation of the memory due to aging. In some cases, the overall size of the code words is maintained at a constant size. In other cases, the overall size of the payload is maintained at a constant size and the parity data footprint is increased. In still other cases, the overall size of the parity data is maintained at a constant size and the user data payload is decreased. In yet other cases, both parity and payload sizes are adjusted to provide successive increases in ECC strength.

In this way, the appropriate level of ECC is applied for the then-existing state of the memory. Different code word indices can be used in different locations at the same time, including for different pages written to the same set of memory cells (e.g., FIG. 11). It is contemplated in some embodiments that data previously stored using a first code index may be relocated during a garbage collection operation to a new location, and the copied over data may be rewritten using a different code index scheme.

While various embodiments have been directed to a flash memory, such is merely exemplary and is not required. The various embodiments can be readily implemented into other forms of solid-state memory including but not limited to spin-torque transfer random access memory (STRAM), resistive random access memory (RRAM), phase change random access memory (PCRAM), magnetic random access memory (MRAM), etc.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a solid-state non-volatile memory; and
a processing circuit configured to write data to a selected location of the memory in the form of multi-bit code words each comprising a user data payload and associated parity data configured to correct one or more bit errors in the user data payload, wherein the processing circuit adjusts at least a selected one of a size of the code words, a size of the user data payloads or a size of the parity data responsive to at least a selected one of an accumulated count of access operations upon the selected location or an error rate associated with the selected location.

2. The apparatus of claim 1, wherein the memory is arranged into a plurality of erasure blocks each comprising a plurality of rows of memory cells, each row having a selected data capacity, wherein the processing circuit stores an integer number of code words to each row.

3. The apparatus of claim 1, wherein the processing circuit stores a first set of data in a first set of code words having a first ratio of bits of user data payload to parity data and stores a second set of data in a second set of code words having a different, second ratio of user data payload to parity data, wherein each of the code words in the respective first and second sets of code words have a common overall length.

4. The apparatus of claim 1, wherein the processing circuit stores a first set of data in a first set of code words having a first ratio of bits of user data payload to parity data and stores a second set of data in a second set of code words having a different second ratio of user data payload to parity data, wherein each of the code words in the respective first and second sets of code words have a common overall number of bits of user data payload.

5. The apparatus of claim 1, wherein the processing circuit stores a first set of data in a first set of code words having a first ratio of bits of user data payload to parity data and stores a second set of data in a second set of code words having a different, second ratio of user data payload to parity data, wherein each of the code words in the respective first and second sets of code words have a common overall number of bits of parity data.

6. The apparatus of claim 1, wherein the processing circuit further comprises a bit error rate (BER) measurement circuit which measures a BER during readback operations upon the selected memory location, and wherein the processing circuit adjusts at least a selected one of the size of the code words, the size of the user data payloads or the size of the parity data responsive to the measured BER.

7. The apparatus of claim 1, wherein the memory comprises a flash memory having a plural number of A memory cells along a row of memory cells in an erasure block, and wherein the processing circuit stores a plural number N of the code words to the A memory cells of a selected row, each of the N code words having a common bit length.

8. The apparatus of claim 7, wherein the A memory cells along the selected row are configured as multi-level cells (MLCs) which store first and second pages of data to the same cells, wherein the first page comprises a first set of code words each having a first total number of parity data bits and the second page comprises a second set of code words each having a different, second total number of parity data bits.

9. The apparatus of claim 1, wherein the processing circuit arranges first input data into code words with a first, relatively low error correction code (ECC) strength in the parity data responsive to a relatively low access count associated with the selected location and wherein the processing circuit subsequently arranges second input data into code words with a second, relatively high ECC strength in the parity data responsive to a relatively high access count associated with the selected location.

10. An apparatus comprising:
a flash memory module comprising an array of non-volatile flash memory cells arranged into rows and columns, the flash memory cells further arranged into erasure blocks each individually erasable during an erase operation, each erasure block comprising a plurality of rows each having a plural number of A cells; and
a processing circuit configured to, responsive to input data from a host device, arrange the input data into a plurality of code words for storage to a selected row of a selected erasure block, each code word comprising a user data payload of K bytes and associated parity data of R bytes, the associated parity data arranged to correct up to a selected number of errors in the user data payload, wherein the processing circuit selects the respective K and R byte values responsive to at least a selected one of an accumulated number of access operations associated with the selected row or a measured bit error rate (BER) associated with the selected row.

11. The apparatus of claim 10, wherein the processing circuit stores a first set of data to a first selected row as a first set of code words having a first ratio of bits of user data payload to parity data and stores a second set of data to a different, second selected row as a second set of code words having a different, second ratio of user data payload to parity data, wherein each of the code words in the respective first and second sets of code words have a common overall length.

12. The apparatus of claim 10, wherein the processing circuit stores a first set of data to a first selected row as a first set of code words having a first ratio of bits of user data payload to parity data and stores a second set of data to a different, second selected row as a second set of code words having a different second ratio of user data payload to parity data, wherein each of the code words in the respective first and second sets of code words have a common overall number of bits of user data payload.

13. The apparatus of claim 10, wherein the processing circuit stores a first set of data to a first selected row as a first set of code words having a first ratio of bits of user data payload to parity data and stores a second set of data to a different, second selected row as a second set of code words having a different second ratio of user data payload to parity data, wherein each of the code words in the respective first and second sets of code words have a common overall number of bits of parity data.

14. The apparatus of claim 10, wherein the processing circuit further comprises a bit error rate (BER) measurement circuit which measures the BER during readback operations upon the selected memory location, and wherein the processing circuit adjusts at least a selected one of the size of the code words, the size of the user data payloads or the size of the parity data responsive to the measured BER.

15. A method comprising:
arranging a solid-state non-volatile memory into a plurality of memory locations;
identifying an accumulated count of access operations upon a selected memory location;
measuring an error rate associated with the selected memory location; and
writing data to a selected memory location in the form of multi-bit code words each comprising a user data payload and associated parity data configured to correct at least one bit error in the user data payload, wherein an integral number of said code words are written to the selected memory location, and wherein at least a selected one of a size of the code words, a size of the user data payloads or a size of the parity data is selected responsive to at least a selected one of the accumulated count of access operations or the measured error rate.

16. The method of claim 15, wherein the memory is arranged into a plurality of erasure blocks each comprising a plurality of rows of memory cells, each row having a selected data capacity, and wherein an integer number of code words are written to each row.

17. The method of claim 15, wherein the writing step comprises storing a first set of data in a first set of code words having a first ratio of bits of user data payload to parity data and storing a second set of data in a second set of code words having a different, second ratio of user data payload to parity data, wherein each of the code words in the respective first and second sets of code words have a common overall length.

18. The method of claim 15, wherein the writing step comprises storing a first set of data in a first set of code words having a first ratio of bits of user data payload to parity data and storing a second set of data in a second set of code words having a different second ratio of user data payload to parity data, wherein each of the code words in the respective first and second sets of code words have a common overall number of bits of user data payload.

19. The method of claim 15, wherein the writing step comprises storing a first set of data in a first set of code words having a first ratio of bits of user data payload to parity data and storing a second set of data in a second set of code words having a different second ratio of user data payload to parity data, wherein each of the code words in the respective first and second sets of code words have a common overall number of bits of parity data.

20. The method of claim 15, wherein each of the size of the code words, the size of the user data payloads and the size of the parity data are adjusted for subsequent data stored to the selected memory location while maintaining an integral number of said code words in the selected memory location.

* * * * *